United States Patent
Pelissier et al.

(10) Patent No.: US 9,307,053 B2
(45) Date of Patent: Apr. 5, 2016

(54) DIRECT DATA PLACEMENT OVER USER DATAGRAM PROTOCOL IN A NETWORK ENVIRONMENT

(71) Applicant: CISCO TECHNOLOGY, INC., San Jose, CA (US)

(72) Inventors: Joseph E. Pelissier, Hillsboro, OR (US); Claudio DeSanti, Oakland, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 346 days.

(21) Appl. No.: 13/922,012

(22) Filed: Jun. 19, 2013

(65) Prior Publication Data

US 2014/0317165 A1    Oct. 23, 2014

Related U.S. Application Data

(60) Provisional application No. 61/815,163, filed on Apr. 23, 2013.

(51) Int. Cl.
*H04L 29/06* (2006.01)
*H04L 29/08* (2006.01)

(52) U.S. Cl.
CPC ............... *H04L 69/08* (2013.01); *H04L 67/10* (2013.01)

(58) Field of Classification Search
CPC ............................ H04L 67/10; H04L 69/08
See application file for complete search history.

(56) References Cited

U.S. PATENT DOCUMENTS

| | | | |
|---|---|---|---|
| 6,718,392 B1 * | 4/2004 | Krause | 709/238 |
| 7,010,607 B1 * | 3/2006 | Bunton | 709/228 |
| 7,103,626 B1 * | 9/2006 | Recio et al. | 709/201 |
| 7,971,236 B1 * | 6/2011 | Lentini | 726/6 |
| 2002/0133620 A1 * | 9/2002 | Krause | 709/238 |
| 2003/0031183 A1 * | 2/2003 | Kashyap et al. | 370/395.2 |
| 2003/0195983 A1 * | 10/2003 | Krause | 709/238 |
| 2004/0049580 A1 * | 3/2004 | Boyd et al. | 709/226 |
| 2007/0291792 A1 * | 12/2007 | Watfa et al. | 370/469 |
| 2008/0168471 A1 * | 7/2008 | Benner et al. | 719/314 |
| 2010/0085889 A1 * | 4/2010 | Duffield et al. | 370/252 |
| 2012/0265837 A1 * | 10/2012 | Grant et al. | 709/212 |

* cited by examiner

*Primary Examiner* — Michael C Lai
(74) *Attorney, Agent, or Firm* — Patent Capitol Group

(57) ABSTRACT

An example method for direct data placement over User Datagram Protocol (UDP) in a network environment is provided and includes creating a queue pair (QP) for unreliable datagram transport in Infiniband according to an OpenFabrics Application Programming Interface (API) specification, mapping data generated by an application for transmission over the QP in a network environment to a UDP datagram, and passing the UDP datagram to a network interface for transmission.

20 Claims, 7 Drawing Sheets

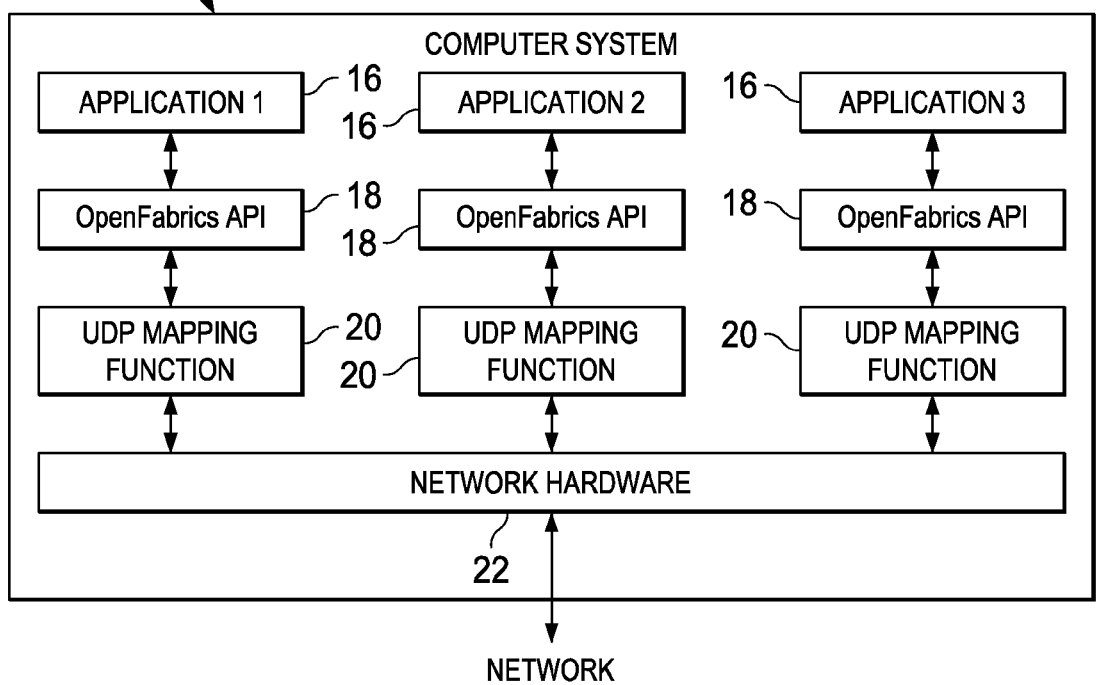
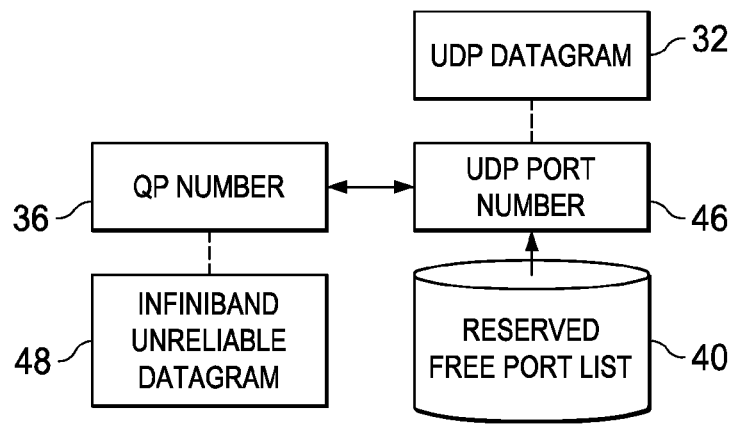

| OpenFabrics PROCEDURE | InfiniBand VERB |
|---|---|
| ibv_alloc_pd | ALLOCATE PROTECTION DOMAIN |
| ibv_dealloc_pd | DEALLOCATE PROTECTION DOMAIN |
| ibv_attach_mcast | ATTACH QP TO MULTICAST GROUP |
| ibv_detach_mcast | DETACH QP FROM MULTICAST GROUP |
| ibv_create_ah | CREATE ADDRESS HANDLE |
| ibv_destroy_ah | DESTROY ADDRESS HANDLE |
| ibv_create_cq | CREATE COMPLETION QUEUE |
| ibv_destroy_cq | DESTROY COMPLETION QUEUE |
| ibv_create_qp | CREATE QUEUE PAIR |
| ibv_destroy_qp | DESTROY QUEUE PAIR |
| ibv_event_type_str | NA |
| ibv_node_type_str | NA |
| ibv_port_state_str | NA |
| ibv_fork_init | NA |
| ibv_get_async_event | REQUEST COMPLETION NOTIFICATION, SET COMPLETION EVENT HANDLER, SET ASYNCHRONOUS EVENT HANDLER |
| ibv_ack_async_event | REQUEST COMPLETION NOTIFICATION, SET COMPLETION EVENT HANDLER, SET ASYNCHRONOUS EVENT HANDLER |
| ibv_get_cq_event | REQUEST COMPLETION NOTIFICATION, SET COMPLETION EVENT HANDLER, SET ASYNCHRONOUS EVENT HANDLER |
| ibv_ack_cq_events | REQUEST COMPLETION NOTIFICATION, SET COMPLETION EVENT HANDLER, SET ASYNCHRONOUS EVENT HANDLER |
| ibv_get_device_guid | NA |
| ibv_get_device_list | NA |
| ibv_free_device_list | NA |
| ibv_get_device_name | NA |
| ibv_open_device | OPEN HCA |
| ibv_close_device | CLOSE HCA |
| ibv_poll_cq | POLL FOR COMPLETION |
| ibv_post_recv | POST RECEIVE REQUEST |
| ibv_post_send | POST SEND REQUEST |
| ibv_query_pkey | NA |

| ibv_qp component: | RESTRICTIONS: |
|---|---|
| pd | SHOULD BE SET TO NULL |
| srq | SHOULD BE SET TO NULL |
| qp_num | SHOULD BE SET TO THE UDP PORT NUMBER CORRESPONDING TO THIS QUEUE PAIR |
| qp_type | SHOULD BE SET TO IBV_QP_UD |
| src_domain | SHOULD BE SET TO NULL |

| ibv_ah_attr component: | RESTRICTIONS: |
|---|---|
| dlid | SET TO ZERO, IGNORED BY PROCEDURE |
| sl | SET TO A VALUE BETWEEN 0 AND 7, INDICATES THE ETHERNET PRIORITY VALUE. MAY BE IGNORED BY THE PROCEDURE |
| src_path_bits | SET TO ZERO, IGNORED BY PROCEDURE |
| is_global | SHOULD BE SET TO TRUE |
| port_num | SET TO ZERO, IGNORED BY PROCEDURE |

| ibv_global_route component: | RESTRICTIONS: |
|---|---|
| flow_label | SET TO ZERO, IGNORED BY PROCEDURE |
| sgid_index | SET TO ZERO, IGNORED BY PROCEDURE. THE SEND OPERATION WILL PROVIDE THE SOURCE IP ADDRESS |
| hop_limit | SET TO ZERO, IGNORED BY PROCEDURE |
| traffic_class | SET TO ZERO, IGNORED BY PROCEDURE |

FIG. 8

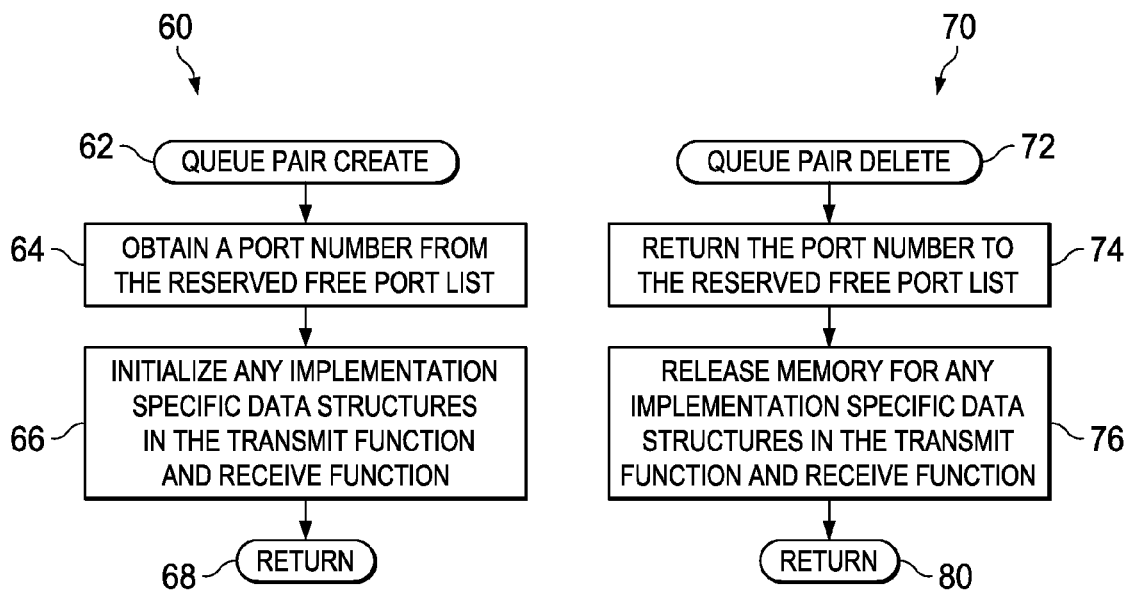

| ibv_qp_init_attr component: | RESTRICTIONS: |
|---|---|
| srq | SHOULD BE SET TO NULL |
| qp_type | SHOULD BE SET TO IBV_QPT_UD |
| xrc_domain | SHOULD BE SET TO NULL |

FIG. 9

| ibv_send_wr component: | RESTRICTIONS: |
|---|---|
| opcode | SHOULD BE SET TO IVB_WR_SEND |
| send_flags | SET TO ZERO, IGNORED BY PROCEDURE |
| imm_data | SET TO ZERO, IGNORED BY PROCEDURE |
| wr | SHOULD CONTAIN THE UD UNION MEMBER |
| remote_qpn | SHOULD CONTAIN THE UDP PORT NUMBER OF THE REMOTE DEVICE |

DIRECT DATA PLACEMENT OVER USER DATAGRAM PROTOCOL IN A NETWORK ENVIRONMENT

CROSS-REFERENCE TO RELATED APPLICATION

This application claims the benefit of priority under 35 U.S.C. §119(e) to U.S. Provisional Application Ser. No. 61/815,163, entitled "DIRECT DATA PLACEMENT OVER USER DATAGRAM PROTOCOL (UDP)" filed Apr. 23, 2013, which is hereby incorporated by reference in its entirety.

TECHNICAL FIELD

This disclosure relates in general to the field of communications and, more particularly, to direct data placement over user datagram protocol (UDP) in a network environment.

BACKGROUND

A local area network (LAN) can transfer data and messages between computer systems and storage elements through a high-speed network. The LAN consists of a communication infrastructure, which provides physical connections. It also includes a management layer, which organizes the connections, computer systems, and storage elements, so that data transfer is secure and robust. The LAN allows any-to-any connections across the network by using interconnect elements such as switches. The LAN introduces the flexibility of networking to enable one server or many heterogeneous servers to share common communication facilities. A network might include only computer systems, or may additionally include storage devices, including disks, tapes, and optical storage.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2 is a simplified block diagram illustrating example details of the communication system in accordance with one embodiment;

FIG. 4 is a simplified diagram illustrating other example details of an embodiment of the communication system;

FIG. 5 is a simplified block diagram illustrating further example details of an embodiment of the communication system;

FIG. 6 is a simplified block diagram illustrating further example details of an embodiment of the communication system;

FIG. 7 is a simplified block diagram illustrating further example details of an embodiment of the communication system;

FIG. 8 is a simplified block diagram illustrating further example details of an embodiment of the communication system;

FIG. 9 is a simplified block diagram illustrating further example details of an embodiment of the communication system;

FIG. 10 is a simplified block diagram illustrating further example details of an embodiment of the communication system;

FIG. 11 is a simplified flow diagram illustrating example operations that may be associated with an embodiment of the communication system;

FIG. 12 is a simplified flow diagram illustrating other example operations that may be associated with an embodiment of the communication system;

DETAILED DESCRIPTION OF EXAMPLE EMBODIMENTS

Overview

An example method for direct data placement over UDP in a network environment is provided and includes creating a queue pair (QP) for unreliable datagram transport (e.g., in Infiniband according to an OpenFabrics Application Programming Interface (API) specification), mapping data generated by an application for transmission over the QP in a network environment to a UDP datagram, and passing the UDP datagram to a network interface for transmission.

Example Embodiments

Figure 1:
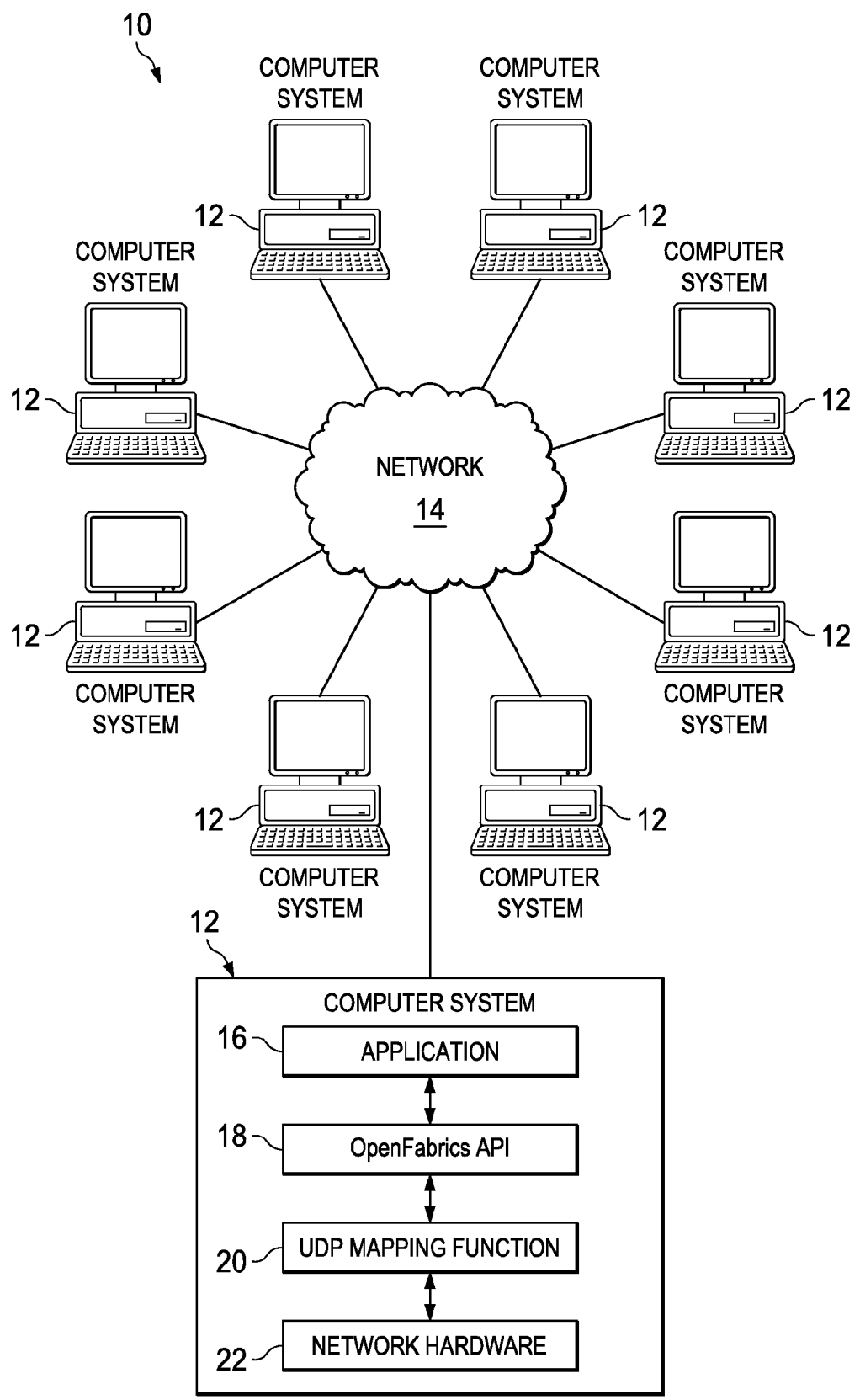
FIG. 1 is a simplified block diagram illustrating a communication system to facilitate direct data placement over UDP in a network environment according to an example embodiment.

FIG. 1 is a simplified block diagram illustrating an embodiment of communication system 10 for facilitating direct data placement over UDP in a network environment. Communication system 10 includes a plurality of computer systems 12 communicating with each other over a network 14. An example computer system 12 is shown in greater detail in the figure. Computer system 12 can include an application 16, an OpenFabrics Application Programming Interface (API) 18, a UDP mapping function 20, and network hardware 22. Embodiments of communication system 10 can implement message passing functions of OpenFabrics API 18 over UDP.

As used herein, the term "computer system" refers to any suitable combination of hardware and software that can process a set of inputs (e.g., electronic signals, audio signals, optical signals) through arithmetic or logical operations and generate another set of outputs (e.g., electronic signals, audio signals, optical signals). Examples of computer system includes computers (e.g., desktop computers, laptop computers, servers, etc.), and mobile computing devices (e.g., smart phones, tablets, etc.). As used herein, an "application" can be inclusive of any executable file comprising instructions that can be understood and processed on a computer system, and may further include library modules loaded during execution, object files, system files, hardware logic, software logic, or any other executable modules. The application can include user space applications and kernel applications.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential implementations.

InfiniBand is a high speed, low latency switched fabric communication link (e.g., interconnect). InfiniBand provides an efficient communication channel for high-performance and clustered compute applications (among other features). InfiniBand offers point-to-point bidirectional serial links intended for connecting processors with high-speed peripherals such as disks. InfiniBand uses a switched fabric topology, as opposed to a hierarchical switched network like traditional Ethernet architecture. Transmissions begin or end at a channel adapter. Each processor contains a host channel adapter (HCA) and each peripheral has a target channel adapter (TCA). InfiniBand transmits data in packets of up to 4 KB that, taken together, form a message. A message can be: a direct memory access read from a remote node; a direct memory access write to a remote node; a channel send or receive; a transaction-based operation (e.g., that can be reversed); a multicast transmission; or an atomic operation.

InfiniBand enables Direct Data Placement (DDP) and Remote Direct Memory Access (RDMA). DDP allows the efficient placement of data into buffers designated by Upper Layer Protocols (e.g., protocols such as RDMA that are semantically layered above DDP). RDMA provides the semantics to enable direct memory access remotely between peers in a way consistent with application requirements. Several pieces of data are carried in the InfiniBand message headers to support these capabilities.

InfiniBand is different from traditional network protocols such as UDP and Transmission Control Protocol (TCP)/Internet Protocol (IP)/Ethernet. InfiniBand provides a messaging service that applications can access directly. The messaging service can be used for storage, InterProcess Communication (IPC) or other purposes, where an application can communicate with other applications in a network environment. In contrast to TCP/IP/Ethernet and other traditional network protocols, InfiniBand messaging service is presented to the application directly (without intervention by the operating system). For example, the application need not rely on the operating system to transfer messages. In contrast, in traditional network environment, shared network resources, such as the TCP/IP stack are solely owned by the operating system and cannot be accessed by the application.

Moreover, the underlying technology used to transport and deliver the messages is different from TCP/IP/Ethernet's byte-stream oriented transport for conducting bytes of information between application sockets. The traditional byte stream-oriented network using TCP/IP/Ethernet presents a stream of bytes to the application. Each time an Ethernet packet arrives, the server network interface card (NIC) hardware places the bytes comprising the packet into an anonymous buffer in main memory belonging to the operating system. After the stream of bytes has been received into the operating system's buffer, the TCP/IP network stack signals the application to request a buffer from the application into which the bytes can be placed. This process is repeated each time a packet arrives until the entire message is eventually received.

In particular, UDP is a transport layer protocol for client/server network applications based on IP/Ethernet. UDP network traffic is organized in the form of UDP datagrams. As used herein, the term "datagram" refers to a basic transfer unit (e.g., packet) associated with a packet-switched network, in which the delivery, arrival time, and order of arrival of the basic transfer unit are not guaranteed by the network service. The datagram can include a self-contained, independent entity of data (e.g., packet) carrying sufficient information to be routed from a source application to a destination application without reliance on earlier exchanges between the source application and the destination application and the transporting network. Applications use datagram sockets (e.g., network interfaces) to establish host-to-host communications over UDP/IP. The sockets are bound to UDP end points, which are respective combinations of IP addresses and port numbers. (A port is a software structure that is identified by the port number, which is a 16 bit integer value between 0 and 65535). The Internet Assigned Numbers Authority (IANA) generally assigns port numbers for specific uses. For example, ports 49152 through 65535 are dynamic ports that are not officially designated for any specific service, and can be used for any purpose, including transmission using UDP/IP.

In contrast to byte-stream networks, InfiniBand delivers a complete message to the application directly. After the application has requested transport of a message, the InfiniBand hardware automatically segments the outbound message into a number of packets; the packet size is chosen to optimize the available network bandwidth. Packets are transmitted through the network by the InfiniBand hardware and at the receiving end, they are delivered directly into the receiving application's virtual buffer where they are re-assembled into a complete message.

InfiniBand specifications do not include an API. Instead, InfiniBand specifications specify services that an InfiniBand API should provide in the form of "verbs." The set of verbs, taken together, represent a semantic description of the methods the application uses to request service from the message transport service. The verb is an abstract description of the functionality of a HCA. An operating system may expose some or all of the verb functionality through its programming interface.

The OpenFabrics Alliance (www.openfabrics.org) has defined an open-source C language API called OpenFabrics API, which is compliant with the Infiniband requirements/specifications. The OpenFabrics API currently operates over InfiniBand, TCP/IP, and Ethernet (but not over UDP/IP). Several drivers for popular interface cards are provided with the OpenFabrics API. Not all drivers provide full DDP and the performance and latency can vary widely depending on the particular implementation. The OpenFabrics API does not support communication using UDP/IP protocol. The applications interface with OpenFabrics API and use the Infiniband verbs to generate and transmit messages for DDP (and other Infiniband supported operations).

Three queues are generally defined in the verb abstraction for the control of operations (an operation is a protocol message, or sequence of messages, which provide an architectural semantic, such as reading or writing of a data buffer): send queue; receive queue; and completion queue. The queues (e.g., send queue, receive queue, completion queue) comprise memory buffers located proximate network interfaces (e.g., HCA or equivalent interfaces) for transmission or receipt of messages. For example, the queues exist on the HCA in Infiniband configured network elements.

The send queue and receive queue represent two ends of a channel of communication between two applications (e.g., Initiator and Responder) using the InfiniBand messaging service. The combination of the send queue and receive queue is called a "queue pair" (QP). A connection is made by linking a local QP to a remote QP. If the application requires more than one connection, more QPs are created. To permit the application to access the QPs, the QPs are mapped into each application's virtual address space, providing the application with direct access to the messaging service without intervention by the host computer system's operating system. An identifier called a queue pair number can identify a specific QP. A Service ID Resolution Protocol (SIDR) can be used to discover queue pair numbers.

InfiniBand supports the following operations (among others): send; RDMA read; and RDMA write. Send operations and RDMA write operations may contain immediate data, which is a four-byte data item that is posted to the receiving application's completion queue upon completion of the operation. A send or receive operation works as follows. A remote (receiving) application uses a "Post Receive Request" verb to build one or more work requests (WRs) which are placed on a receive queue. A local (sending) application uses a "Post Send Request" verb to place one or more WRs on a send queue. Each receive WR represents a receive buffer in the application's virtual address space. Each WR on the send queue represents a message that the application wishes to be sent to the application at the other end of the channel. The send operation targets a buffer represented by the WR on the receive queue at the opposite end of the channel. The sending application does not know the virtual address of the buffer to which the send operation is targeted; instead the send operation is targeted to the receiver QP's receive queue, which contains a pointer to the application's buffer.

Appropriate command indication and a list of pointers to the data to be used for the operation are posted to the send queue and the receive queue. For a send operation, a gather list is provided that points to the data to be sent. For an RDMA write operation, a gather list is provided that points to the source data on the initiating application and a pointer in the virtual address space of the receiving application that indicates the location where the data is to be written. For an RDMA read operation, a scatter list is provided that indicates to where the data is to be written on the initiating application, and a pointer in the virtual address space of the receiving application that indicates from where the data is to be read.

InfiniBand send operations may be over reliable transport or unreliable transport and may be performed over connected or non-connected channels. Four options for the send operation include: reliable connection; unreliable connection; reliable datagram; and unreliable datagram. An unreliable connection is a transport service type in which a QP is associated with only one other QP, such that messages transmitted by the send queue of one QP are unreliably delivered to the receive queue of the other QP. Messages with errors are not retried by the transport, and error handling is provided by a higher level protocol. An unreliable datagram is a transport service type in which a QP may transmit and receive single-packet messages to or from any other QP. Ordering and delivery are not guaranteed, and the receiver may drop delivered packets.

Datagram service may use an identifier called Queue Key (Q_Key), which can act as a handle to validate a remote application's right to access a local receive queue. For example, if the Q_Key present in an incoming packet does not match the value stored in the receiving QP, the packet is dropped. The RDMA read operation is supported only over reliable connections or reliable datagrams. The RDMA write operation is supported over reliable connections, reliable datagrams, and unreliable connections.

Although InfiniBand architecture can provide robust communication between applications, it requires specialized hardware, such as the HCA, TCA, cables and connectors, and switches and routers specially configured to support InfiniBand. For example, InfiniBand switches are designed to be "cut through" for performance and cost reasons and they implement InfiniBand's link layer flow control protocol to avoid dropped packets. The InfiniBand infrastructure can be relatively much more expensive than traditional network architecture that employs UDP or TCP/IP. Moreover, the ubiquity of Ethernet networks can ensure interoperability, which may be lacking in specialized Infiniband networks. Use of InfiniBand generally results in two parallel networks: the InfiniBand network for message passing and a separate Ethernet network for traditional network operations. Use of Layer 2 Ethernet with InfiniBand networks typically limits scalability as routing is not supported. Use of TCP adds additional protocol complexity when used alongside InfiniBand networks.

Communication system 10 is configured to address these issues (and others) in offering a system and method for direct data placement in a network environment. Embodiments of communication system 10 can create a QP for unreliable datagram transport according to OpenFabrics API specification. Application 16 can interface with OpenFabrics API 18 to generate data over the QP for transmission in network 14. UDP mapping function 20 can map the data to a UDP datagram, and pass (e.g., forward, provide, present, give, transmit, etc.) the UDP datagram to appropriate network hardware 22 for transmission. Network hardware 22 may include appropriate network interfaces configured to send and receive UDP datagrams according to UDP/IP/Ethernet protocols.

According to various embodiments, application 16 can communicate with OpenFabrics API 18 to effect communication with other computer systems 12. OpenFabrics API 18 may communicate with UDP mapping function 20 to map the high-level API semantics into UDP datagrams. The UDP datagrams can be communicated with network hardware 22 and network 14 appropriately. A subset of OpenFabrics API specifications related specifically to message passing and unreliable datagram service may be supported by UDP mapping function 20. In addition, some of the procedures in the OpenFabrics specifications may be reduced in their functionalities. Additional OpenFabrics functionality may be supported, for example, with addition of appropriate tags in the UDP data stream. Support of InfiniBand Secure Inter-Domain Routing (SIDR) protocol may also be included. Embodiments of communication system 10 can support the message passing functionality of OpenFabrics API 18 over UDP/IP to provide a simplified and converged message passing facility.

Communication may be converged on a single network instead of using an Ethernet network for traditional network activity and InifiniBand for message passing. InfiniBand with UDP can provide a routable protocol, increasing scalability compared to Layer 2 Ethernet solutions. Moreover, InfiniBand/UDP combination may be simpler than InfiniBand/TCP combination.

Turning to the infrastructure of communication system 10, the network topology can include any number of servers, virtual machines, switches (including distributed virtual switches), routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications.

Additionally, any one or more of these elements may be combined or removed from the architecture based on particular configuration needs. Communication system 10 may include a configuration capable of UDP/IP communications for the electronic transmission or reception of data packets in a network. Communication system 10 may also operate in conjunction with a TCP/IP or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration. Communication system 10 can include any number of computer systems 12, switches, server load balancers and other network elements within the broad scope of the embodiments.

The example network environment may be configured over a physical infrastructure that may include one or more networks and, further, may be configured in any form including, but not limited to, local area networks (LANs), wireless local area networks (WLANs), virtual local area networks (VLANs), metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, Infiniband, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In various embodiments, network hardware 22 includes any suitable type of networking hardware such as standard NICs and other network components that are compatible with UDP/IP transport. Because UDP/IP transport is typically configured to be hardware independent, virtually any suitable network hardware components may be used within the broad scope of the embodiments.

FIG. 2 is a simplified block diagram illustrating example details of an embodiment of communication system 10. Computer system 12 can include a virtualized environment, wherein more than one instances of application 16, OpenFabrics API 18, and UDP mapping function 20 may exist simultaneously. Each application 16 may generate data for transmission, which may be mapped to respective UDP datagrams by corresponding UDP mapping function 20. A commonly shared set of network hardware 22 may transmit the UDP datagrams over network 14. Similarly, UDP datagrams received over network 14 by network hardware 22 may be sent to appropriate application 16 through corresponding UDP mapping function 20, which may map the UDP datagram to data compatible with OpenFabric API 18 for application 16.

Figure 3:
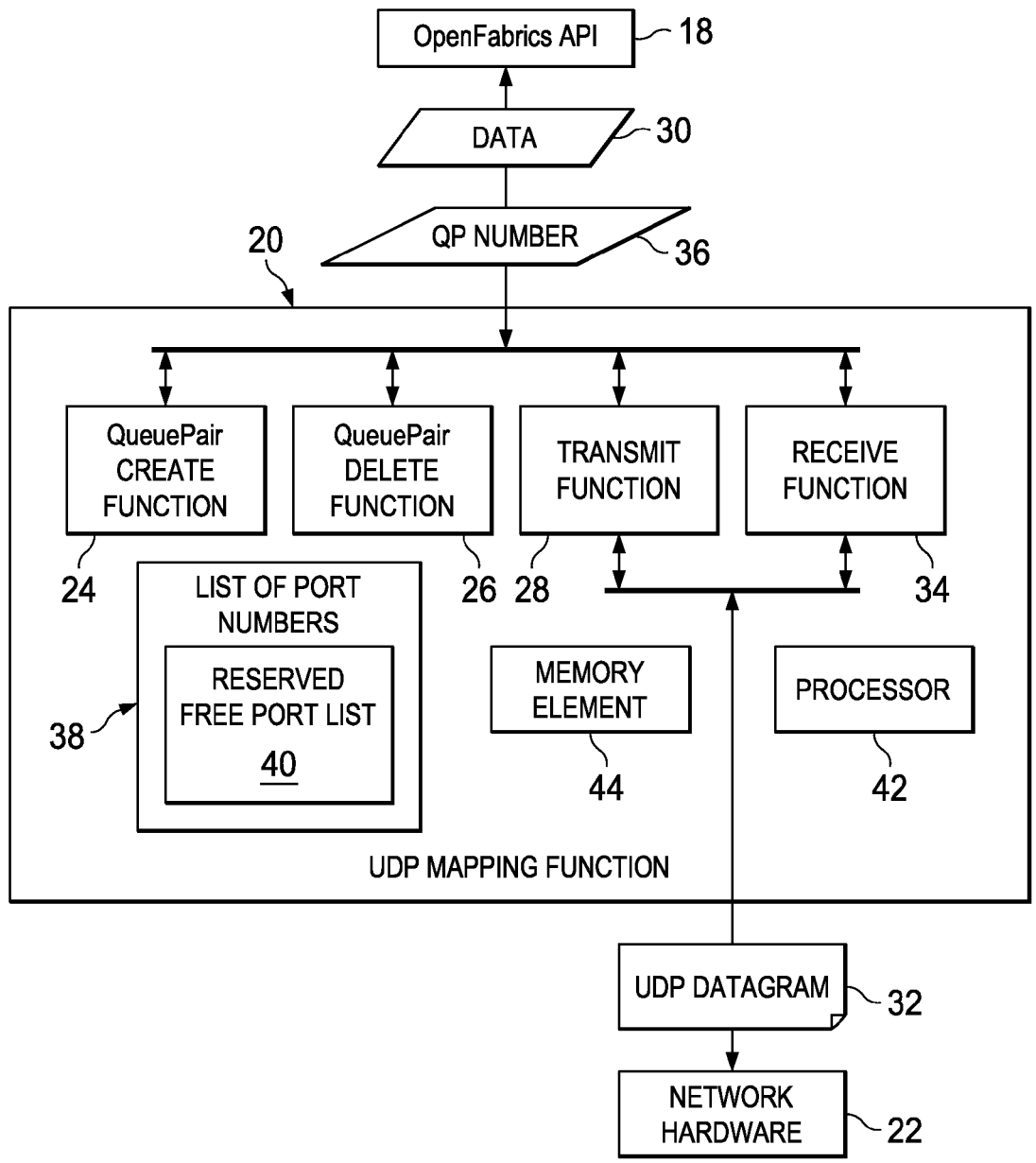
FIG. 3 is a simplified block diagram illustrating other example details of the communication system in accordance with one embodiment.

FIG. 3 is a simplified block diagram illustrating example details of an embodiment of communication system 10. A queue pair create function 24 and a queue pair delete function 26 may represent functions that communicate with Open Fabrics API 18. In various embodiments, queue pair create function 24 and queue pair delete function 26 may not have any direct interaction with network hardware 22. A transmit function 28 can map data 30 from OpenFabrics API 18 into a UDP datagram 32, which can be passed to network hardware 22 for transmission on network 14. A receive function 34 can extract data 30 from UDP datagram 32 received from network 14 by network hardware 22 and pass data 30 to Open Fabrics API 18.

UDP mapping function 20 may map a UDP port number in UDP datagram 32 to a queue pair number 36. Queue pair number 36 is generally used for unreliable datagram transport in Infiniband. Open Fabrics API 18 can obtain queue pair number 36 from UDP mapping function 20 when a QP is generated. Queue pair number 36 provided by UDP mapping function 20 may be an available port number. UDP mapping function 20 may maintain a list of port numbers 38 reserved for generating queue pair number 36. List of port numbers 38 may maintain a record of unused port numbers and used port numbers (e.g., used as queue pair number 36). The record of unused available port numbers may be stored as reserved free port list 40. When a QP is generated, a specific queue pair number may be obtained from amongst the unused pot numbers in reserved free port list 40. When the QP is deleted, the port number may be returned to reserved free port list 40 in list of port numbers 38. A processor 42 and a memory element 44 may facilitate the operations described herein.

FIG. 4 is a simplified diagram illustrating example details that may be associated with an embodiment of communication system 10. In various embodiments, queue pair number 36 may be synonymous with a corresponding UDP port number 46. UDP port number 46 may be used in UDP datagram 32; QP number 36 may be used by an InfiniBand unreliable datagram 48. To avoid conflicts with IANA port assignments, the UDP port numbers may be allocated out of a dynamic port number range of 49152 through 65535, which may be typically used by the computer system's operating system for normal TCP and UDP operations. A subset of port number range of 49152 through 65535 may be reserved for use by Open Fabric API 18 in reserved free port list 40. In embodiments implementing Linux operating system, the port number reservation may be made in a /etc./sysctl.conf file. The number of reserved port numbers may be sufficient to support a desired number of QPs that would not simultaneously adversely impact TCP and UDP performance significantly.

FIG. 5 is a simplified diagram illustrating example details that may be associated with an embodiment of communication system 10. Example implementations of UDP mapping function 20 can support procedures and associated qualifications of OpenFabric API 18 that are directed to unreliable datagrams. Table 50 lists some of the example procedures provided by OpenFabrics API 18, and the corresponding InfiniBand verb, supported in the example embodiments of UDP mapping function 20, with or without qualifications. Embodiments of communication system 10 may support substantially all such procedures (with or without appropriate qualifications for unreliable datagrams) and appropriate data structures in UDP mapping function 20 to enable generating UDP datagram 32 from data 30 and vice versa.

In a specific example, use of an ibv_gid union function contained in infiniband/verbs.h may be restricted to a raw datagram (e.g., data link layer service which provides the QP with the ability to send and receive raw datagram messages that are not interpreted). Within the raw datagram, an IPv6 address may be encoded. On IPv4 networks, the IPv4 address may be encoded in the IPv6 address. In another example, procedure ibv_attach_mcast (e.g., function that attaches QP qp to a multicast group having MGID gid and MLID lid) with qualifications may not initiate subnet management actions to configure routing for the multicast group; instead, they may initiate Internet Group Management Protocol (IGMP) messages to configure the routing.

In yet another example, ibv_post_recv (e.g., function that posts linked list of WRs starting with wr to the receive queue of the queue pair qp) qualifications may indicate that an initial 40 bytes of the receive buffer may not contain a global routing header (GRH). (Current specifications indicate that the initial the Global Routing Header (GRH) of the incoming message will be placed in the first 40 bytes of the buffer(s) in the scatter list). Instead, the initial bytes of the receive buffer may contain the entire IP and UDP headers. IP and UDP headers may be of various lengths depending on version and options. In some embodiments, a fixed amount of buffer may be reserved for the headers so that the payload can include a fixed offset. In yet another example, a port_num argument be ignored by an ibv_query_pkey (e.g., function that returns a P_Key value (in network byte order) in entry index of port port_num for device context [context] through pointer pkey) qualifications procedure and the port_num argument may be set to zero.

FIG. 6 is a simplified diagram illustrating example details that may be associated with an embodiment of communication system 10. Table 52 indicates example restrictions on values of some components of an ibv_qp data structure in infiniband/verbs.h library file used in OpenFabrics API to create QPs. The ibv_qp data structure may include various components suitable for unreliable datagrams.

FIG. 7 is a simplified diagram illustrating example details that may be associated with an embodiment of communication system 10. Table 54 indicates example restrictions on values of some components of an ibv_ah_attr data structure.

FIG. 8 is a simplified diagram illustrating example details that may be associated with an embodiment of communication system 10. Table 56 indicates example restrictions on values of some components of an ibv_global_route data structure, which may be provided for UDP implementation using UDP mapping function 20.

FIG. 9 is a simplified diagram illustrating example details that may be associated with an embodiment of communication system 10. Table 58 indicates example restrictions on the values of some components of an ibv_qp_init_attr data structure.

FIG. 10 is a simplified diagram illustrating example details that may be associated with an embodiment of communication system 10. Table 59 indicates example restrictions on values of some components of an ibv_send_wr data structure.

FIG. 11 is a simplified flow diagram illustrating example operations 60 that may be associated with QP create function 24 according to an example embodiment of communication system 10. At 62, a QP may be initialized by QP create function 24. For example, application 16 may call a QP create function in OpenFabric API 18 to create a QP for data transport over Infiniband using an unreliable datagram. OpenFabric API 18 may interface with QP create function 24 to create appropriate QPs at UDP mapping function 20. At 64, QP create function 24 may obtain UDP port number 46 from reserved free port list 40 and assign UDP port number 46 as queue pair number 36, for example, to support unreliable datagram transport. At 66, any implementation specific data structures may be initialized in transmit function 28 and receive function 34. At 68, the operations may end with the generation of an appropriate QP at UDP mapping function 20.

FIG. 12 is a simplified flow diagram illustrating example operations 70 that may be associated with QP delete function 26 according to an example embodiment of communication system 10. At 72, a QP deletion may be initialized by QP delete function 26. For example, application 16 may interface with OpenFabric API 19 to indicate that the QP at UDP mapping function 20 can be deleted and the associated memory released. At 74, QP delete function 24 may return queue pair number 36 to list of port numbers 38. At 76, any memory allocated for any implementation specific data structure in transmit function 28 and receive function 34 may be released. At 78, the operations may end with the deletion of the QP at UDP mapping function 20.

Figure 13:
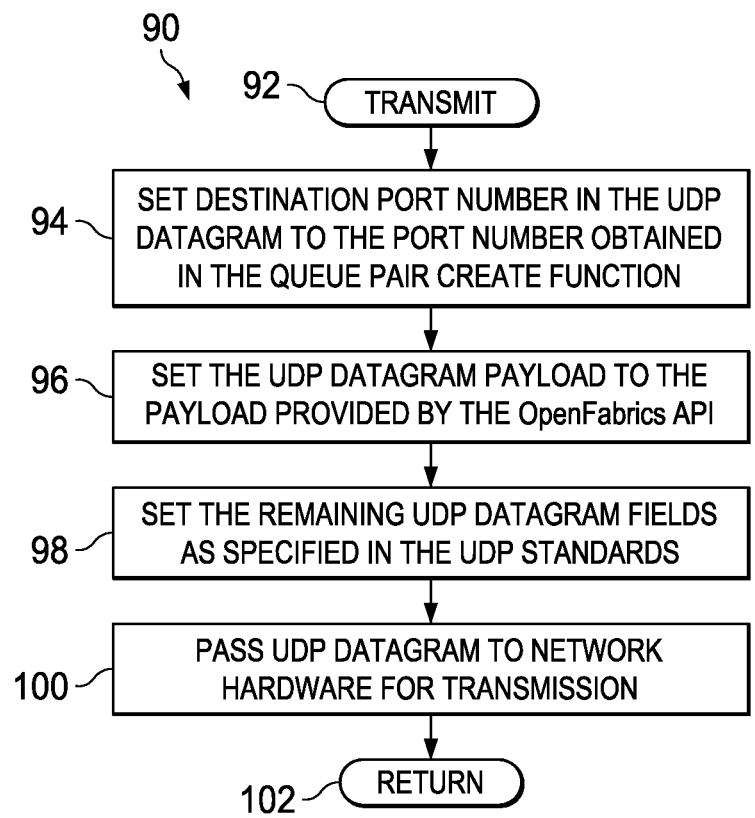
FIG. 13 is a simplified flow diagram illustrating yet other example operations that may be associated with an embodiment of the communication system.

FIG. 13 is a simplified flow diagram illustrating example operations 90 that may be associated with transmit function 28 according to an example embodiment of communication system 10. At 92, transmitting of data 30 may be initialized by transmit function 28. At 94, a destination port number in UDP datagram 32 may be set to the port number obtained from list of port numbers 38 in queue pair create function 24. At 96, a payload of UDP datagram 32 may be set to a payload provided in data 30 by OpenFabrics API 18. At 98, the remaining UDP datagram fields may be set as specified in applicable UDP standards. At 100, UDP datagram 32 may be passed to network hardware 22 for transmission. At 102, the operations may end.

Figure 14:
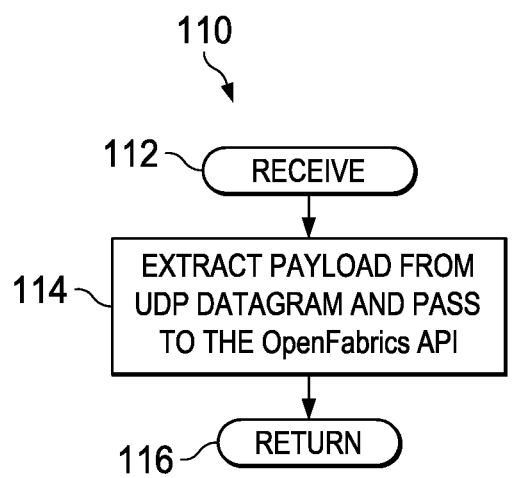
FIG. 14 is a simplified flow diagram illustrating yet other example operations that may be associated with an embodiment of the communication system.

FIG. 14 is a simplified flow diagram illustrating example operations 110 that may be associated with receive function 34 according to an example embodiment of communication system 10. At 112, UDP datagram 32 may be received by receive function 34. At 114, the payload from UDP datagram 32 may be extracted and passed as data 30 to OpenFabrics API 18. At 116, the operations may end.

Note that in this Specification, references to various features (e.g., elements, structures, modules, components, steps, operations, functions, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments.

In example embodiments, at least some portions of the activities outlined herein may be implemented in software in, for example, computer system 12. In some embodiments, one or more of these features may be implemented in hardware, provided external to these elements, or consolidated in any appropriate manner to achieve the intended functionality. The various network elements (e.g., computer systems 12) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, UDP mapping function 20 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 39) can store data used for the operations described herein. This includes the memory element being able to store instructions (e.g., software, logic, code, etc.) in non-transitory computer readable media, such that the instructions are executed to carry out the activities described in this Specification. A processor can execute any type of instructions associated with the data to achieve the operations detailed herein in this Specification. In one example, processors (e.g., processor 38) could transform an element or an article (e.g., data) from one state or thing to another state or thing.

In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory computer readable storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    creating a queue pair (QP) in memory for unreliable datagram transport, wherein an application generates data over the QP for transmission in a network environment, the data being compatible with an OpenFabrics Application Programming Interface (API), wherein creating the QP comprises mapping a QP number of the QP to a user datagram protocol (UDP) port number in a reserved free port list;
    mapping the data to a UDP datagram, wherein mapping the data comprises setting a destination port number in the UDP datagram to the QP number, and including the data in a payload of the UDP datagram; and
    passing the UDP datagram to a network interface for transmission.

2. The method of claim 1, wherein the network interface is configured to send and receive the UDP datagram according to UDP protocols.

3. The method of claim 1, further comprising:
    extracting the data from the UDP datagram; and
    passing the data to the OpenFabrics API.

4. The method of claim 1, wherein
    the UDP port number is obtained from the reserved free port list.

5. The method of claim 4, wherein the reserved free port list comprises port numbers allocated out of a port number range of 49152 through 65535.

6. The method of claim 4, further comprising:
    deleting the QP;
    returning the QP number to the reserved free port list; and
    releasing memory allocated to the QP.

7. The method of claim 1, wherein mapping the data further comprises:
    setting fields in the UDP datagram according to UDP standards.

8. One or more non-transitory tangible media encoding logic that includes instructions for execution and when executed by a processor, is operable to perform operations comprising:
    creating a queue pair (QP) in memory for unreliable datagram transport, wherein an application generates data over the QP for transmission in a network environment, the data being compatable with an OpenFabrics Application Programming Interface (API), wherein creating the QP comprises mapping a QP number of the QP to a user datagram protocol (UDP) port number in a reserved free port list;

mapping the data to a UDP datagram, wherein mapping the data comprises setting a destination port number in the UDP datagram to the QP number, and including the data in a payload of the UDP datagram; and passing the UDP datagram to a network interface for transmission.

9. The media of claim 8, wherein the network interface is configured to send and receive the UDP datagram according to UDP protocols.

10. The media of claim 8, further comprising:
extracting the data from the UDP datagram; and
passing the data to the OpenFabrics API.

11. The media of claim 8, wherein
the UDP port number is obtained from the reserved free port list.

12. The media of claim 11, wherein the reserved free port list comprises port numbers allocated out of a port number range of 49152 through 65535.

13. The media of claim 11, further comprising:
deleting the QP;
returning the QP number to the reserved free port list; and
releasing memory allocated to the QP.

14. The media of claim 8, wherein mapping the data further comprises:
setting fields in the UDP datagram according to UDP standards.

15. An apparatus, comprising:
a memory element for storing data; and
a processor that executes instructions associated with the data, wherein the processor and the memory element cooperate such that the apparatus is configured for:
creating a queue pair (QP) in memory for unreliable datagram transport, wherein an application generates data over the QP for transmission in a network environment, the data being compatible with an OpenFabrics Application Programming Interface (API), wherein creating the QP comprises mapping a QP number of the QP to a user datagram protocol (UDP) port number in a reserved free port list;
mapping the data to a UDP datagram, wherein mapping the data comprises setting a destination port number in the UDP datagram to the QP number, and including the data in a payload of the UDP datagram; and
passing the UDP datagram to a network interface for transmission.

16. The apparatus of claim 15, further comprising:
extracting the data from the UDP datagram; and
passing the data to the OpenFabrics API.

17. The apparatus of claim 15, wherein
the UDP port number is obtained from the reserved free port list.

18. The apparatus of claim 17, wherein the reserved free port list comprises port numbers allocated out of a port number range of 49152 through 65535.

19. The apparatus of claim 17, further comprising:
deleting the QP;
returning the QP number to the reserved free port list; and
releasing memory allocated to the QP.

20. The apparatus of claim 15, wherein mapping the data further comprises:
setting fields in the UDP datagram according to UDP standards.

* * * * *